C. R. S. J. HALLÉ.
UNIVERSAL PARALLEL SPRING MOTION MECHANISM.
APPLICATION FILED SEPT. 14, 1908.
980,774.
Patented Jan. 3, 1911.
2 SHEETS—SHEET 1.
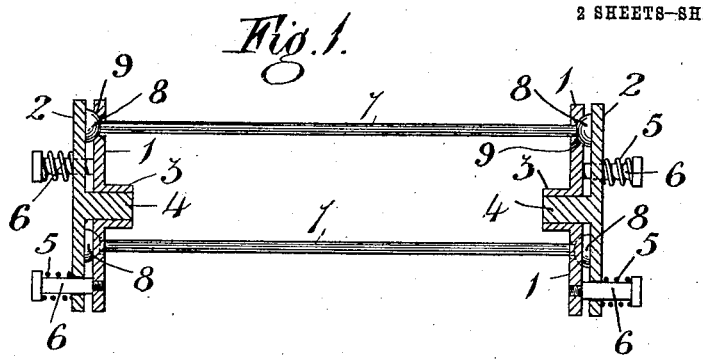
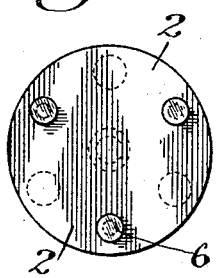
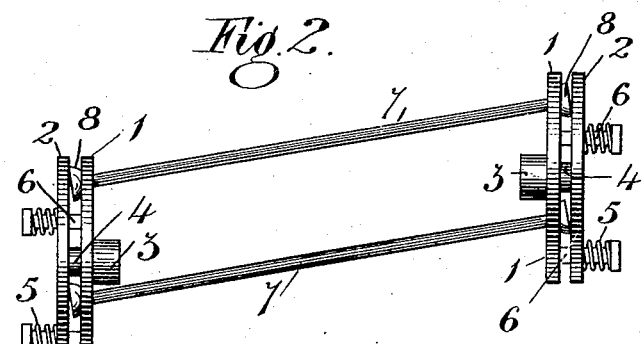
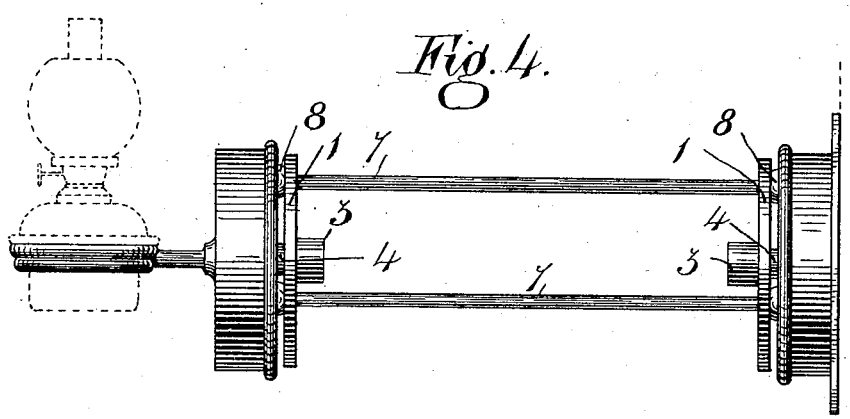
Witnesses:
Inventor
Clifford R. S. J. Hallé
By
James L. Norris
Atty C. R. S. J. HALLÉ.
UNIVERSAL PARALLEL SPRING MOTION MECHANISM.
APPLICATION FILED SEPT. 14, 1908.
980,774.
Patented Jan. 3, 1911.
2 SHEETS—SHEET 2.
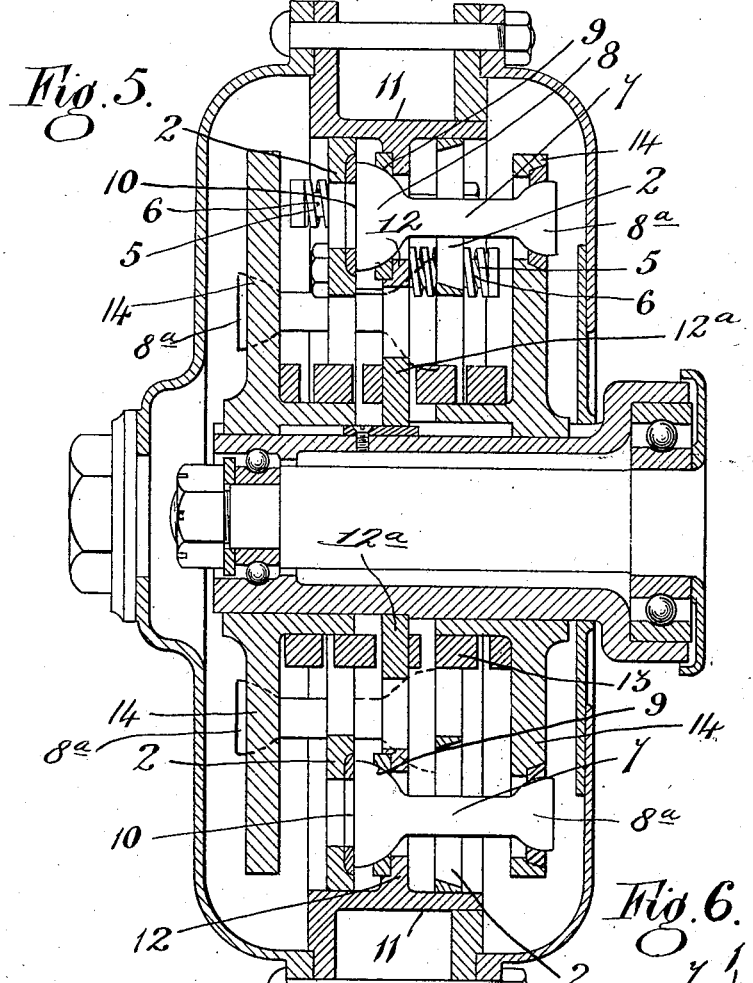
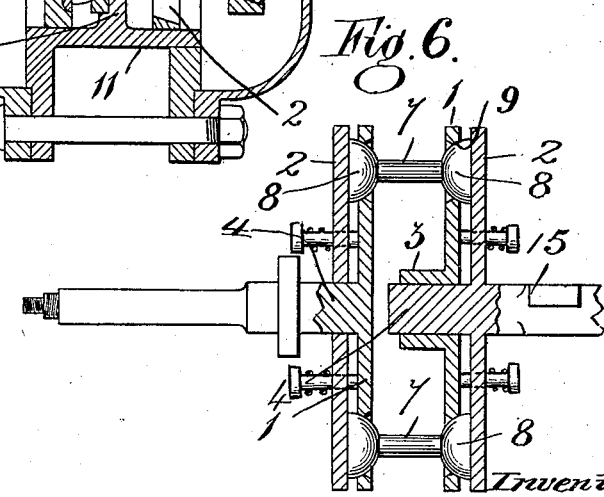
Witnesses:
Inventor
Clifford R. S. J. Hallé
By James L. Norris
Atty
THE NORRIS PETERS CO., WASHINGTON, D. C.

UNITED STATES PATENT OFFICE.

CLIFFORD ROBERT STEPHEN JOHN HALLÉ, OF LONDON, ENGLAND.

UNIVERSAL-PARALLEL-SPRING-MOTION MECHANISM.

980,774.

Specification of Letters Patent.

Patented Jan. 3, 1911.

Application filed September 14, 1908. Serial No. 453,044.

*To all whom it may concern:*

Be it known that I, CLIFFORD ROBERT STEPHEN JOHN HALLÉ, a subject of the King of Great Britain, residing at London, England, have invented certain new and useful Improvements in Universal-Parallel-Spring-Motion Mechanism, of which the following is a specification.

The object of my invention is to provide a mechanism by which one body can be supported at a distance from another body by spring support in such a manner that while originally supported in a straight line without any sagging, yet it is capable of moving freely in any direction, but at the same time always keeping parallel to the supporting body. The means by which I accomplish this are as follows:—I take two pairs of plates which are connected together by means of a tube on one and a boss on the other, the boss fitting inside the tube so that the plates can separate by the one sliding on the boss of the other. One of the plates of each pair is perforated with three or more cup shaped holes, and fitting in these cup shaped holes are large half-balls on the ends of bars, in such a manner that the flat side of the half-ball at either end of the bar is pressed by the unperforated plate into its cup in the perforated plate. The two plates of each pair are pressed together by means of numerous springs, either of the plunger and spiral spring type or any similar method which will assure the two plates being pressed together very forcibly by means of springs. It is evident that the bars cannot move in any direction without the plates being separated one from the other against the tension of the springs and that owing to the number of bars which are parallel to each other, if one pair of plates is moved, this pair must always remain parallel to the other pair, and the moment the pressure is relaxed, the plates will resume their original position. It is also evident that according as the spring pressure is greater so can a greater weight be supported before the bars leave the original position.

My invention and the method of construction will be readily understood by the aid of the annexed drawings, in which—

Figure 1 is a sectional elevation of the mechanism in the normal position, and Figs. 2 and 3 elevation, and face view, of the front plate, respectively, the mechanism being under stress, and Fig. 4 an elevation of one arrangement of parallel action mechanism, as applied to the purpose of supporting an article, such as, a lamp. Fig. 5 is a section showing my parallel action mechanism as applied to a wheel hub, and Fig. 6 is a part sectional elevation showing the system applied to a wheel axle which is in two pieces joined together by the said parallel action mechanism.

1 and 2 are the two plates, 1 being the perforated plate with the tube 3, and 2 the plain plate with the boss 4 entering the tube on 1. These plates are pressed together by means of springs 5 on the plungers 6 secured to plate 1; 7, 7, are the bars upon which the semi-spherical heads or half-balls 8 are fitted. The bars 7 project through openings in the plates 1 and the half balls 8 seat in sockets 9 surrounding said openings.

If one of the plates 2 be supported rigidly it is evident that a weight can be attached to the other plate 2 at the outer end without causing any movement until the weight overcomes the resistance of the springs 5 which prevent the spherical heads 8 from turning in their sockets 9. As soon as the weight becomes greater than the spring pressure can support, the unfixed plate 2 will begin to drop, but at the same time the plates 1 will be forced away from the plates 2 by the turning of the half balls 8 and thus the springs 5 will be further compressed; and if the weight is reduced again to the original, the springs 5 will extend again and lift it with the plate 2 into the original position, one plate 2 having been all the time parallel to the other plate 2. The bars 7 thus give a double universal cantaliver action, the center of the half ball 8 being the fulcrum and the radius of the half ball in all directions forming the short arm of a right-angled lever while the bar itself forms the long arm.

By varying the size of the half-balls, it is evident that although the two plates 2 will not remain always absolutely the same distance, one from the other, as well as parallel to each other, they can be made practically always equi-distant, as the turning of the head of the half-ball compensates for the loss in distance from the different positions of the bars. This mechanism may be applied in many ways where a spring motion between two parallel bodies in any direction is necessary. It is applicable to spring wheels and the method by which I accomplish this is as follows:—The application of the improvement shown in Fig. 5 demands the employment of two series of bars 7 which extend in opposite directions and have common association with a centrally arranged flange 12 which is formed as a part of the hub 11. In place of half balls of similar size at both ends of each bar, a half ball 8 of larger diameter is provided at the inner end of a bar and a half ball 8ª of smaller diameter is provided at the outer end of a bar. The half balls 8 have their seating in openings provided therefor in the ring 12 and steel rings 2 are held against the flat back surfaces of the half balls 8, this relation being maintained by springs 5. It is, consequently, impossible for the links or bars 7 to assume an angle without pressing the plates 2 outwardly against the spring pressure.

The front of the half ball 8 being as before in a socket 9 revolves on a center which is the center of the ball itself, and half the diameter of the ball 8 is the length of the short right-angled arm of the cantaliver, while the length of the link 7 from the center of this ball is the long arm; if therefore, half the diameter of the ball is ¾ of an inch, and the length of the link is two and a quarter inches, the vertical upward lift at the end of the link from the spring pressure of 1,500 lbs. would be 500 lbs. This action may be employed by taking the hub 11 and placing two rings of steel 2 connected together by a number of small spiral springs 5 on bolts 6 that pass through the rings 2, and the flange 12 which steel rings press against the heads of the half balls as described above. In this case I may employ an additional buffering effect of central spiral springs 13 (divided by a ring 12ª or it may be a single spiral spring without the ring 12ª) to force out the side plates 14 with which the half balls 8ª are associated, against said half balls.

The mechanism may be used as the two outer portions of the axle of vehicles as at Fig. 6, one of the plates 2 being fixed to the axle 15 and the wheel running upon a projection from the outside plate 2. Or it may be used to form a swinging bracket for a lamp, the said bracket being fixed at one end to the wall and the lamp being supported by the opposite plate 2 as at Fig. 4.

What I do claim as my invention, and desire to secure by Letters Patent is:—

1. In a parallel universal motion device of the type set forth, in combination, two pairs of plates, the inner plates having openings, bars connecting the inner plates and passed loosely through said openings, said bars having enlarged portions on their ends and disposed between the plates of each pair, and spring means operating to force the outer plates toward the inner plates and against said enlarged portions, but yieldable whereby the outer plates may be moved away from the inner plates upon the angular movements of said bars.

2. In a parallel universal motion device of the type set forth, in combination, a pair of plates, the inner plate having openings, bars passed loosely through said openings and having enlarged end heads disposed between said plates, spring means for holding said plates against said enlarged heads, said plates being movable away from one another upon the angular movements of said bars and relatively stationary universal pivot connections for the other ends of said bars.

3. In a parallel universal motion device of the type set forth, in combination, a pair of plates, the inner plate having openings, bars passed loosely through said openings and having enlarged end heads disposed between said plates, means for putting pressure on said plates to hold them against such enlarged end heads, said plates being movable toward and away from one another upon the angular movements of said bars, universal pivot connections for the other ends of said bars and yieldable means for putting pressure on said pivot connections.

In testimony whereof I have hereunto set my hand in presence of two subscribing witnesses.

CLIFFORD ROBERT STEPHEN JOHN HALLÉ.

Witnesses:
HUGH HUGHES,
WM. O. BROWN.